United States Patent [19]
Bernstein et al.

[11] Patent Number: 6,064,007
[45] Date of Patent: *May 16, 2000

[54] MOISTURE RESISTANT UNDERGROUND CABLE

[75] Inventors: Bruce S. Bernstein, Rockville, Md.; Leslie S. Rubin, Newton, Mass.

[73] Assignee: Electric Power Research Institute Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/641,093

[22] Filed: Apr. 29, 1996

[51] Int. Cl.$^7$ ........................................ H01B 7/14
[52] U.S. Cl. .................................. 174/110 R; 174/24
[58] Field of Search ......................... 174/23 R, 25 R, 174/14 R, 110 R, 110 PM; 385/107, 108, 109

[56] References Cited

U.S. PATENT DOCUMENTS

| | | | |
|---|---|---|---|
| 3,790,697 | 2/1974 | Buckingham | 174/107 X |
| 4,091,291 | 5/1978 | Foster et al. | 307/95 |
| 4,332,759 | 6/1982 | Ide | 264/108 |
| 4,360,704 | 11/1982 | Madry | 174/107 X |
| 4,505,222 | 3/1985 | Holt et al. | 118/304 |
| 4,725,693 | 2/1988 | Hirsch | 174/107 |
| 4,734,240 | 3/1988 | Chung et al. | 264/211.13 |
| 4,767,183 | 8/1988 | Martin | 385/107 |
| 4,772,089 | 9/1988 | Ide et al. | 350/96.23 |
| 4,778,244 | 10/1988 | Ryan | 350/96.23 |
| 4,801,186 | 1/1989 | Wagatsuma et al. | 350/96.23 |
| 4,810,834 | 3/1989 | Grogl et al. | 174/121 R X |
| 4,869,573 | 9/1989 | Radage et al. | 350/96.23 |
| 4,904,321 | 2/1990 | Harvey | 156/185 |
| 4,906,066 | 3/1990 | Ryan | 350/96.23 |
| 4,910,057 | 3/1990 | Ide et al. | 428/36.9 |
| 4,923,278 | 5/1990 | Kashyap et al. | 350/96.3 |
| 4,973,442 | 11/1990 | Harvey et al. | 264/503 |
| 5,002,358 | 3/1991 | Beresford | 350/96.23 |
| 5,135,783 | 8/1992 | Harvey et al. | 428/1 |
| 5,151,231 | 9/1992 | Lambert et al. | 264/108 |
| 5,156,785 | 10/1992 | Zdrahala | 264/108 |
| 5,248,305 | 9/1993 | Zdrahala | 604/280 |
| 5,288,529 | 2/1994 | Harvey et al. | 428/1 |
| 5,302,334 | 4/1994 | Pierini et al. | 264/233 |
| 5,396,104 | 3/1995 | Kimura | 257/784 X |

*Primary Examiner*—Kristine Kincaid
*Assistant Examiner*—Chau N. Nguyen
*Attorney, Agent, or Firm*—Flehr Hobach Test Albritton & Herbert LLP

[57] ABSTRACT

An electrical cable protected against moisture by a tubular liquid crystal film having its molecules multiaxially oriented.

12 Claims, 4 Drawing Sheets

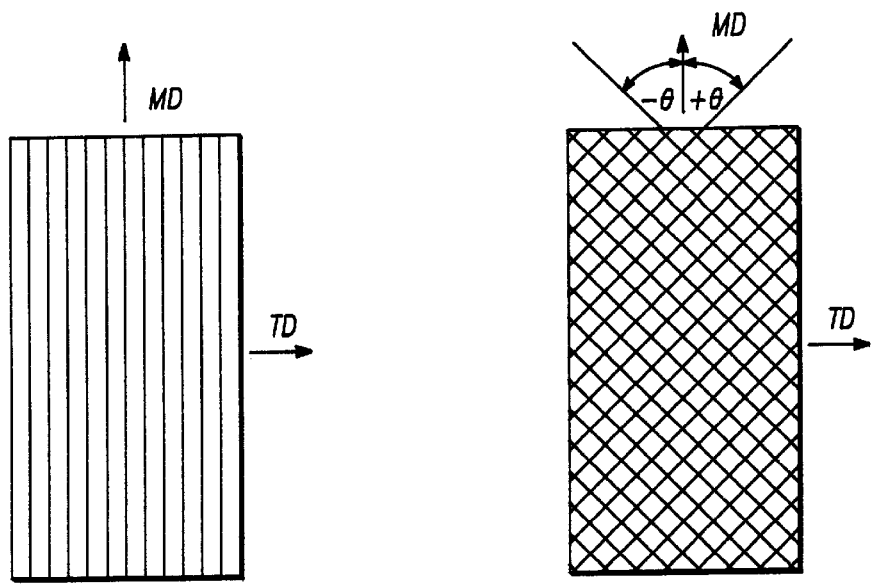
FIG.—1    FIG.—2
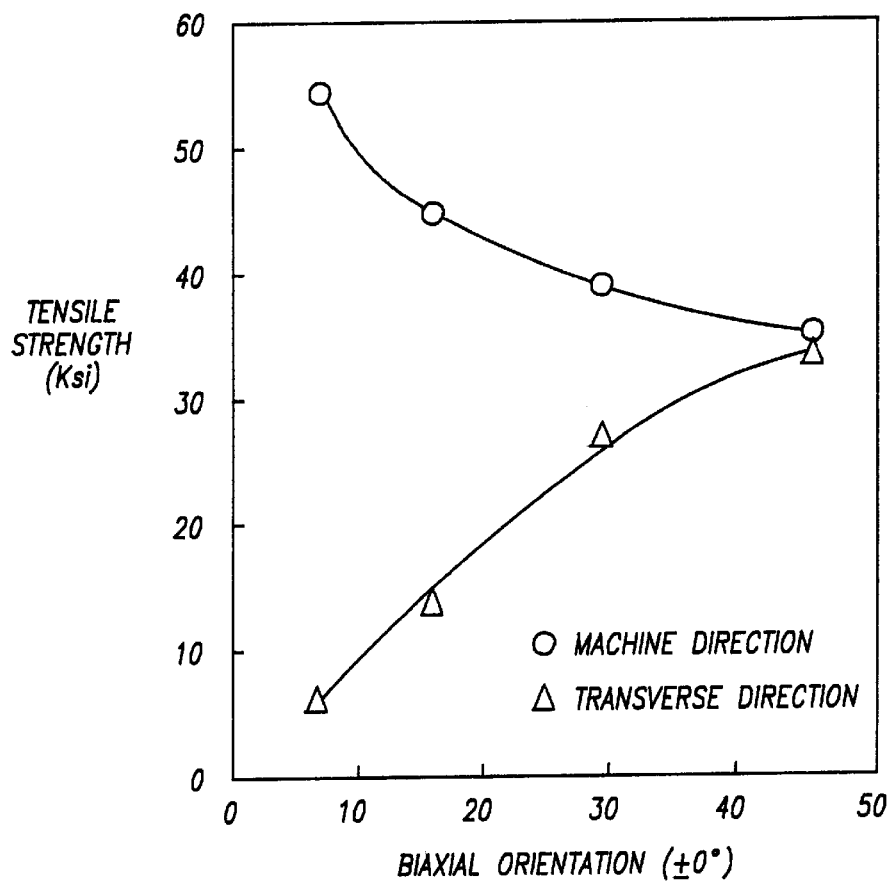
FIG.—3

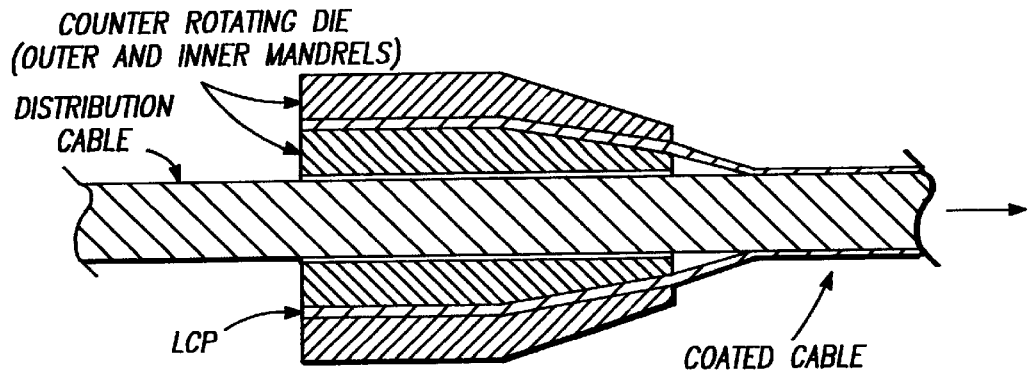
FIG.—4
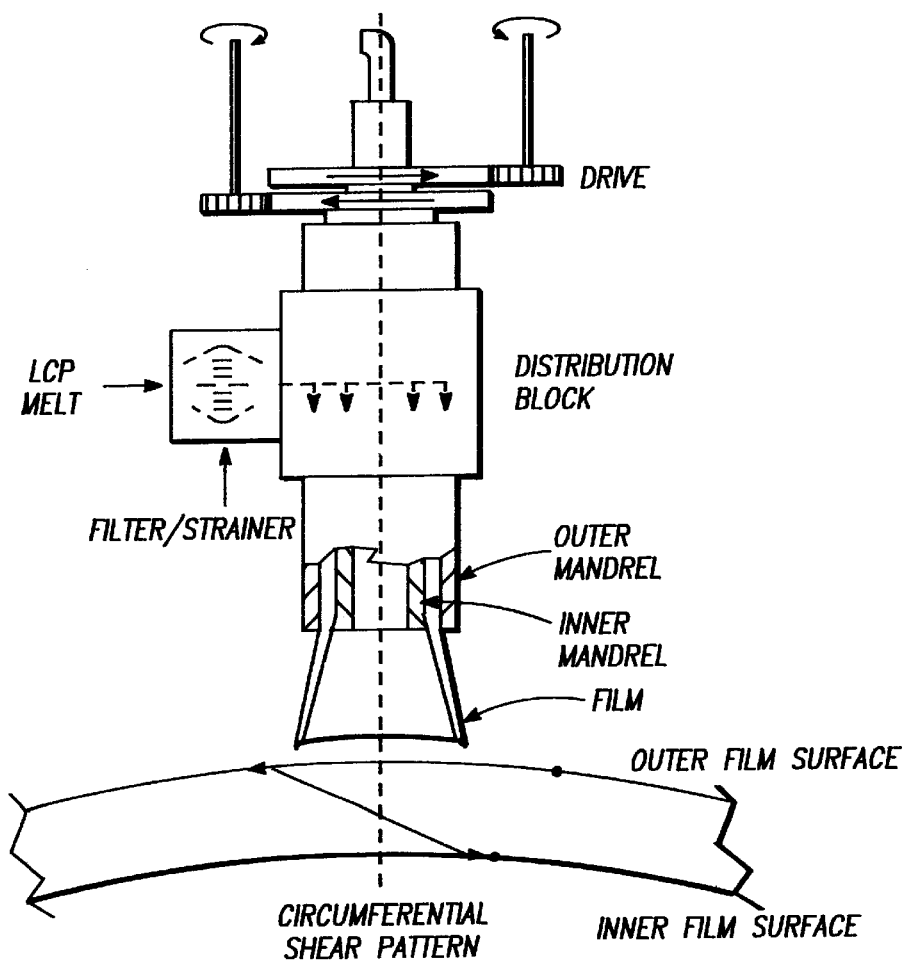
FIG.—5

MOISTURE RESISTANT UNDERGROUND CABLE

BRIEF DESCRIPTION OF THE INVENTION

This invention relates generally to electric underground cables having an inexpensive water barrier and more particularly to an underground cable including a liquid crystal polymer water barrier.

BACKGROUND OF THE INVENTION

Over the past 10 to 15 years the electric power industry and academia have conducted a number of research programs to identify those mechanisms that are responsible for the premature failure of underground electric cables. The results of these activities indicate that many cable failures can be linked to the internal build-up of water trees within the polymeric insulating layers of the cable. Water treeing can be described as micro sized "branching" that is similar to the branch pattern of a tree. These water filled imperfections branch radially inward through the amorphous insulating materials used in today's distribution cables. As the water treeing progresses radially inward the potential for cable failure increases.

Industry has tried to resolve this problem by developing new cable designs that provide superior protection to the infiltration of water. Unfortunately, existing designs that work well to mitigate this problem, such as metallic foils, substantially increase the cost of cable manufacturing.

Recent advances in polymer technology are providing new approaches for solving the water treeing problem described above. Thermotropic liquid crystal polymers (LCPs) are a new class of polymer that provide outstanding water barrier protection. LCPs have water vapor permeabilities that are two orders of magnitude lower than standard polymer materials used for jacketing electrical distribution cable.

LCPs are anisotropic materials that when processed into films form a laminar structure similar to pages in a phone book. These 'submicron thick laminar sheets' lie parallel to the surface of the film and each layer forms a distinct and relatively non-interconnected barrier that resists the formation of continuous radial microcracks.

LCPs derive their outstanding properties from their rigid-rod molecular structure which at a macroscopic level results in self-reinforced materials with exceptional strength, stiffness and barrier properties. The high degree of molecular order of the LCP molecules allows them to attain a very tight packaging density (similar to logs in a river). When combined with the LCP's extremely low gas solubility, an ideal structure is formed for providing superior gas and liquid barrier properties.

Although thermotropic LCPs possess a variety of properties that make them an attractive candidate for this application, standard LCP processing techniques result in films with uniaxial orientation. Such films have exceptional machine (extrusion) direction mechanical properties and very poor transverse mechanical properties. If standard extrusion techniques are used to extrude LCPs over a tubular structure, the resulting LCP coating with its axial molecular orientation would readily split in the axial direction when exposed to even the slightest degree of bending.

OBJECTS AND SUMMARY OF THE INVENTION

It is an object of the present invention to provide a highly moisture resistant underground electric distribution cable.

It is another object of the present invention to provide an economical moisture resistant underground electric distribution cable.

It is a further object of the present invention to provide an electrical distribution cable moisture protected by a thin liquid crystal polymer film.

It is another object of the present invention to provide an electrical distribution cable moisture protected by a thin liquid crystal polymer film which has good mechanical properties.

The foregoing and other objects of the present invention are achieved by an electric distribution cable which is protected by a liquid crystal polymer film having multiaxially oriented molecules.

BRIEF DESCRIPTION OF THE DRAWINGS

The foregoing and other objects of the invention will be more clearly understood from the following description when read in connection with the accompanying drawings of which FIG. 1 schematically shows the molecular orientation of an LCD film having uniaxial molecule orientation.

FIG. 2 schematically shows the molecule orientation of an LCP film having biaxial orientation.

FIG. 3 illustrates the tailoring of machine and transverse mechanical properties through biaxial molecule orientation.

FIG. 4 schematically illustrates a counter-rotating die for extruding biaxially oriented LCP film on a distribution cable.

FIG. 5 is a schematic diagram, partly in cross-section, of a two mandrel extrusion die.

DESCRIPTION OF PREFERRED EMBODIMENT(S)

FIG. 1 schematically shows a thin LCP film formed by standard LCP extrusion processes. The film has uniaxial orientation of the molecules. This provides very high machine direction tensile strength/modulus but very low transverse direction tensile strength/modulus. In contrast, a film such as that illustrate in FIG. 2 has a biaxial molecule orientation which gives substantially equal machine direction and transverse direction strength/modulus.

Liquid crystal polymers are rigid, rod-like macromolecules, typically containing a substantial number of polyvalent aromatic groups such as phenylene. Liquid crystal polymers may be placed into a force field such as shear, in molten state or in solution, to be aligned and oriented, and they tend to retain their orientation on cooling or evaporating. This is because of the stearic hinderance of molecular rotation provided by the large number of polyvalent aromatic or other groups. Thus they exhibit a high "relaxation time", which means that they tend to retain their orientation in the molten state after being placed therein by shear or elongational forces.

We have found liquid crystal polymers such as VECTRA sold by Hoechst-Celanese, XYDAR sold by Amoco and HX8000B sold by DuPont to be particularly suitable.

This advanced film is produced using a counter-rotating die that aligns the LCP molecules along two principal axis within a single ply. The angle between the two principal axis of molecular orientation in the film and the extrusion direction are balanced and identified by a ±θ nomenclature. By controlling the level or degree of biaxial orientation the relative machine and transverse properties can be tailored. FIG. 3 graphically illustrates the relationship between machine direction and transverse direction properties. The tensile strength of the tubular moisture resistant barrier ranges from about 7 to 33 Ksi for the submicron laminar sheet on one surface, and ranges from about 33 to 55 Ksi for the submicron laminar sheet on the other surface, while ±θ ranges from about 5 to 45 degrees.

In this invention a counter-rotating die is used to extrude a biaxially oriented film directly over the distribution cable. A schematic illustration of this type of die forming a film on a cable is shown in FIG. 4.

Figure 6:
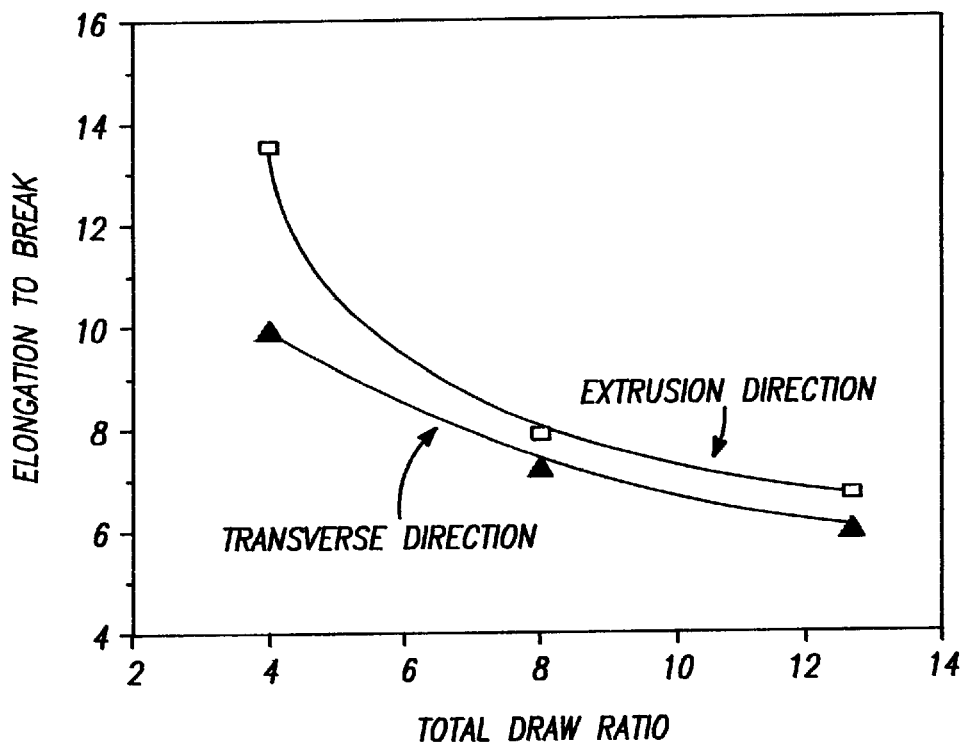
FIG. 6 shows elongation to break as a function of total draw.

FIG. 5 is a schematic diagram partly in cross-section of a suitable two mandrel extrusion die. The parts of the die are identified in the drawing. The die forms no part of the present invention other than provide a means for forming a film in accordance with the invention. The distribution cable is passed through the center of the counter-rotating die during the extrusion process. The LCP extrudate is tailored to have a biaxial orientation that will provide sufficient axial elongation to prevent tension side coating failure during cable bending. As the circular LCP extrudate is drawn onto the cable, the LCP is thinned and the biaxial orientation (±θ) is reduced. By carefully controlling the draw rate, counter-rotating die rotational speed and polymer throughput, the desired biaxial orientation and film thickness can be attained. In addition as shown in FIG. 6, the axial elongation to break can be tailored by adjusting the total draw (i.e., die gap width at discharge/final coating thickness). Elongation break (i.e., maximum elongation) is a critical property that must exceed the maximum strain that the LCP barrier layer will be subjected to during cable bending. Total draw is defined by the thickness of the extrudate as it leaves the die (die gap) divided by the final film thickness. Normally, the more draw that is applied to the LCP in the melt state the more highly aligned the molecules become. Greater alignment usually generates a tighter packing density and possibly improved barrier properties. The final product is a distribution cable that is coated with a thin, yet highly impermeable protective jacket.

It is of course to be understood that by continuing the rotation of the inner and outer mandrels, the molecules in the outer and inner surface may be formed with multiaxial orientation. That is the molecules in the layer may have different angular orientation with respect to the longitudinal axis.

It is of course to be understood that other types of dies can be used. For example, a die such as that described in U.S. Pat. No. 5,288,529 may be used to produce biaxially oriented films having +θ/−θ/−θ/+θ through the film thickness.

Figure 7:
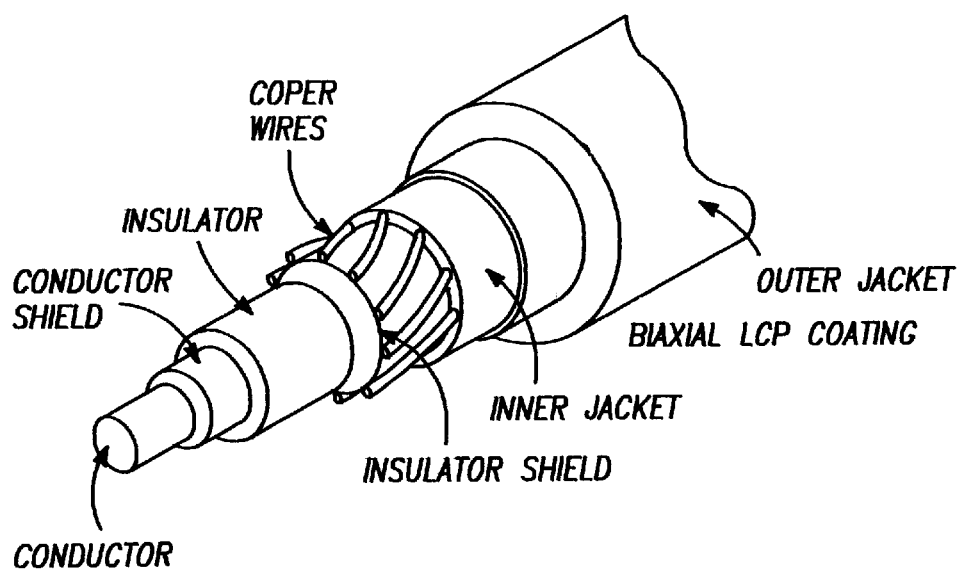
FIG. 7 shows an example of a distribution cable having a biaxial LCP moisture barrier film.

FIG. 7 shows a distribution cable formed with a biaxial liquid crystal polymer coating or film in accordance with the present invention. The cable comprises a conductor for 11 with concentric conductor shield 12, insulator 13, insulator shield 14, copper wires 15 forming an electrical shield, inner jacket 16, biaxial LCP coating 17 and outer jacket 18.

Figure 8:
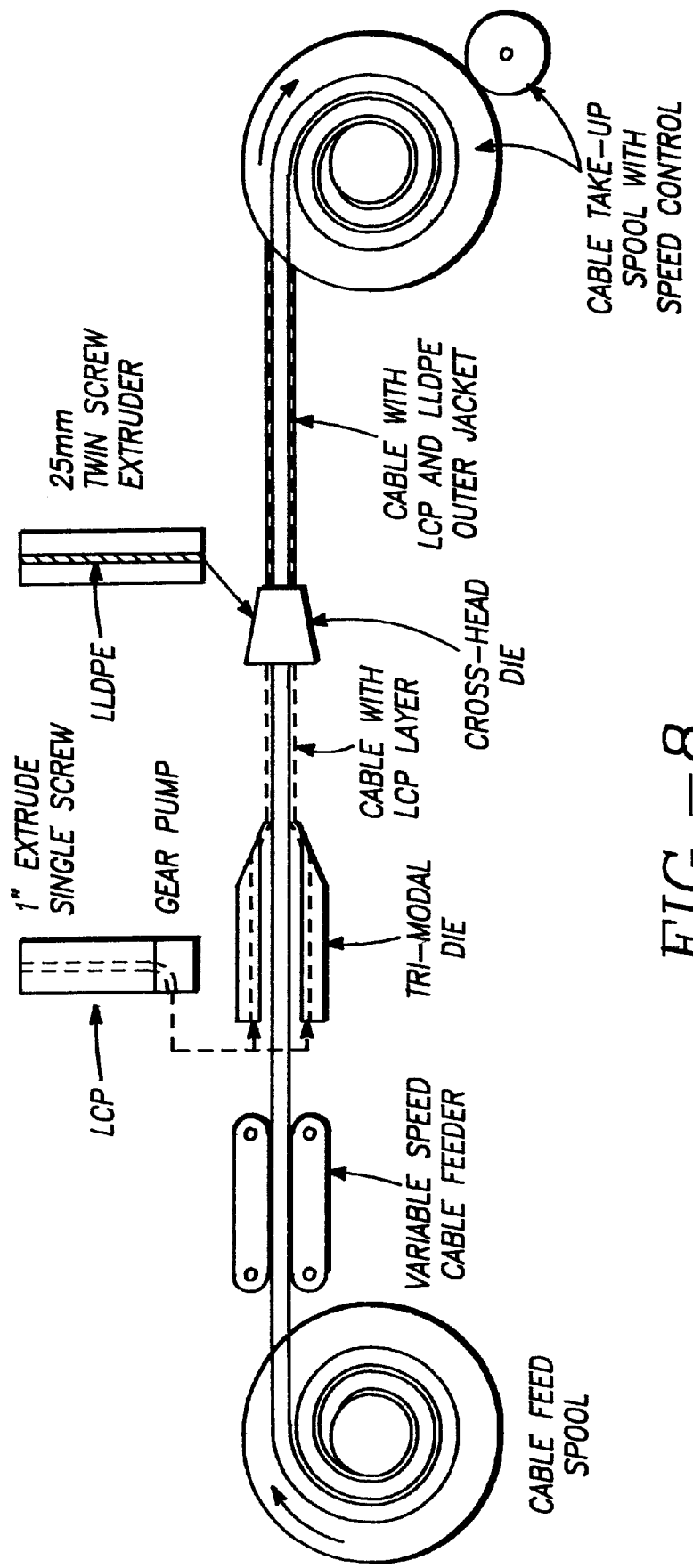
FIG. 8 schematically illustrates a dual die LCD cable coating extrusion system.

A schematic of an LCP film and outer jacket extrusion system is shown in FIG. 8. This dual die extrusion system was used to provide the cable shown in FIG. 7.

What is claimed:

1. An electrical distribution cable including a conductor within a protective tubular assembly which includes a tubular moisture resistant barrier characterized in that said moisture resistant barrier comprises a plurality of submicron laminar sheets of liquid crystal polymer having molecules oriented at an angle which changes from +θ with respect to the axis of the cable for one submicron laminar sheet of the plurality of submicron laminar sheets on one surface of the tubular barrier to −θ with respect to the axis of the cable for another submicron laminar sheet of the plurality of submicron laminar sheets on the other surface of the tubular barrier.

2. The electrical distribution cable of claim 1 wherein the tensile strength of said tubular moisture resistant barrier ranges from about 7 to 33 Ksi for the one submicron laminar sheet on one surface, and ranges from about 33 to 55 Ksi for the other submicron laminar sheet on the other surface.

3. The electrical distribution cable of claim 1 wherein said ±θ ranges from about 5 to 45 degrees.

4. An underground electrical cable protected by a tubular moisture resistant liquid crystal polymer film barrier comprising a plurality of submicron laminar liquid crystal polymer sheet,; having biaxial molecular orientation with respect to the axis of the cable from one submicron liquid crystal polymer sheet of the plurality of submicron laminar liquid crystal polymer sheets on one surface of the barrier to another submicron liquid crystal polymer sheet of the plurality of submicron liquid crystal polymer sheets on the other surface, whereby the cable can be bent without rupturing the protective moisture resistant barrier.

5. The electrical distribution cable of claim 4 wherein the tensile strength of said tubular moisture resistant barrier ranges from about 7 to 33 Ksi for the submicron laminar sheet on one surface, and ranges from about 33 to 55 Ksi for the submicron laminar sheet on the other surface.

6. The electrical distribution cable of claim 4 wherein the biaxial molecular orientation with respect to the axis of the cable ranges from about 5 to 45 degrees.

7. An underground electrical cable in which the cable is protected against ingress of moisture by a tubular liquid crystal polymer barrier having an inner and an outer surface, said barrier comprising a plurality of submicron liquid crystal polymer sheets, each having controlled molecular orientation of molecules with one submicron liquid crystal polymer sheet of the plurality of submicron liquid crystal polymer sheets at the outer surface having molecular orientation in one direction with respect to the axis of said tubular barrier and successive sheets having a changing molecular orientation up to another submicron liquid crystal polymer sheet of the plurality of liquid crystal polymer sheets at the inner surface which has molecular orientation in the opposite direction with respect to the axis of the tubular barrier.

8. The underground electrical cable of claim 7 wherein the tensile strength of said tubular moisture resistant barrier ranges from about 7 to 33 Ksi for the submicron laminar sheet at the outer surface, and ranges from about 33 to 55 Ksi on the submicron laminar sheet on the inner surface.

9. The underground electrical cable of claim 7 wherein said ±θ ranges from about 5 to 45 degrees.

10. An electrical distribution cable including a conductor within a protective tubular assembly which includes a tubular moisture resistant barrier characterized in that said moisture resistant barrier comprises a plurality of submicron laminar sheets of liquid crystal polymer, at least one of said submicron laminar sheets having molecules oriented at an angle of +θ with respect to the axis of the cable and at least another one of said submicron laminar sheets having molecules oriented at an angle of −θ with respect to the axis of the cable.

11. The electrical distribution cable of claim 10 wherein one of said at least one of said submicron laminar sheets is at an outer surface, said plurality of submicron laminar sheets includes an inner submicron laminar sheet at an inner surface having a molecules oriented at an angle of $+\theta$ with respect to the axis of the cable, and said at least another one of said submicron laminar sheets is between said outer surface and said inner surface.

12. The electrical distribution cable of claim 10 wherein said $\pm\theta$ ranges from about 5 to 45 degrees.

* * * * *